United States Patent [19]

Ho et al.

[11] Patent Number: 6,126,448

[45] Date of Patent: Oct. 3, 2000

[54] COMPUTER-AIDED LEARNING METHODS AND APPARATUS FOR A JOB

[76] Inventors: Chi Fai Ho, 4816 Cabello Ct., Union City, Calif. 94587; Peter P. Tong, 1807 Limetree La., Mountain View, Calif. 94040

[21] Appl. No.: 09/110,569

[22] Filed: Jul. 6, 1998

[51] Int. Cl.$^7$ .................................................. G09B 19/00
[52] U.S. Cl. ............................................ 434/219; 434/118
[58] Field of Search ..................................... 434/219, 220, 434/221, 222, 223, 224, 225, 226, 227, 228, 229, 230, 231, 232, 233, 234, 118

[56] References Cited

U.S. PATENT DOCUMENTS

| | | |
|---|---|---|
| 4,611,996 | 9/1986 | Stoner . |
| 5,035,625 | 7/1991 | Monson et al. . |
| 5,259,766 | 11/1993 | Sack et al. . |
| 5,306,154 | 4/1994 | Ujita et al. . |
| 5,316,485 | 5/1994 | Hirose . |
| 5,326,270 | 7/1994 | Ostby et al. . |
| 5,416,694 | 5/1995 | Parrish et al. ............................. 705/8 |
| 5,597,312 | 1/1997 | Bloom et al. . |
| 5,727,950 | 3/1998 | Cook et al. . |
| 5,727,951 | 3/1998 | Ho et al. . |
| 5,743,746 | 4/1998 | Ho et al. . |
| 5,788,504 | 8/1998 | Rice et al. ............................. 434/219 |
| 5,794,178 | 8/1998 | Caid et al. . |
| 5,799,292 | 8/1998 | Hekmatpour ............................. 706/11 |
| 5,823,781 | 10/1998 | Hitchcock et al. ..................... 434/118 |
| 5,879,165 | 3/1999 | Brunkow et al. ....................... 434/322 |
| 5,884,270 | 3/1999 | Walker et al. . |

OTHER PUBLICATIONS

Success Maker Courseware brochure, published by Computer Curriculum Corporation Dec. 1994.
Active Mind Series from World Wide Web, URL=http://www.broderbund.com/studio/ams.html 1996.
Logical Journal of the Zoombinis from World Wide Web, URL32 http://www.broderbund.com/studio/atoz/zoombini.html 1996.
Selecting Software by PC Novice Series, vol. 3, Issue 12, pp. 51,64, and 89–92, 1995.
Computerized Adaptive Testing, Oct. 24, 1994, from World Wide Web, URL=Gopher://Gopher.ETS.org.
Innovation and Technologies, Oct. 21, 1994, from World Wide Web URL=Gopher://Gopher.ETS.org.
Interactive Mathematic Instructor's Guide by Academic Systems, pp. 86 and 114, Aug. 1995.
High School Learning and Resource Library by ProOne, photocopy of the box and screen–dump to get 5 pages 1995.
Asymetrix Librarian from www.asymetrix.com/products/librarian 1998.
PeopleSoft Human Resources Management Solution 1998.
Career Mosaic URL=http://www.careermosaic.com 1998.
Career.com www.career.com 1994–1999.
CareerPath.com www.careerpath.com 1997–1999.
America's Learning Exchange www.alx.org 1998.
Telecommunications Industry by Nova 1996.
FreeLearning.com www.freelearning.com 1999.
Youth@work by Nova Private Industry Council www.youthatwork.com 1997.

*Primary Examiner*—Jacob K. Ackun
*Assistant Examiner*—John Edmund Rovnak
*Attorney, Agent, or Firm*—Peter Tong

[57] ABSTRACT

Computer-aided learning methods and apparatus that can automatically provide learning materials for a user based on a job position related to the user, who is associated with a company. In one embodiment, a retriever retrieves the job position. Then, a learning determinator identifies the one or more jobs needed to be done for the job position, and determines whether the learning materials needed for the one or more jobs should be presented to the user. The job position can be the position the user occupies, or can be the position the user is interested in.

47 Claims, 16 Drawing Sheets

~100

Retrieve Job Position ~102

Determine on Presenting
Learning Materials ~104

Present Learning Materials ~106

~473

Catalog the Documents ~475

Search the Documents ~477

Organize the
Searched Results ~479

Present the Documents ~602

Do Her Job ~604

Generate a Document ~606

Store the Document
in the Document
Database ~608

Figure 13

COMPUTER-AIDED LEARNING METHODS AND APPARATUS FOR A JOB

BACKGROUND OF THE INVENTION

This invention relates generally to computer-aided learning methods and apparatus, and more particularly to computer-aided learning methods and apparatus to help a user regarding a job.

We are living in the midst of tremendous technological changes. In the workplace, technology might be replacing numerous workers. Our job skill might become obsolete within a decade. Though technology is permeating gradually into every stratum of the society, it is very hard to keep up with so much changes.

Not only is it hard to keep up, technology has made the world much smaller, and global competition much more intense. It is not uncommon for a product to have its software written in India, semiconductor chips manufactured in Malaysia, overall physical design done in Italy, and its promotion extensively performed in the United States. The product uses expertise from so many different places because someone in the other side of the world might be able to do the job better than us, but at half of our price.

Not just facing global competition, we are also challenged by the younger generation. Many of them have access to computers and the Web at a very young age. Before graduation from high school, they might have already spent years playing with the Web. Their knowledge in computer might be much more up-to-date and hands-on than ours. They might be much more effective and efficient than us in performing computeroriented jobs.

From the employees' perspective, they are facing the challenge of keeping their jobs. From the employers' perspective, they may be trying to keep their people. Employers have to produce good products at reasonable prices in order for their companies to survive. But, with competition from so many directions, it is becoming more and more difficult for employers not to consider laying off some of their employees.

Our career is at risk. We need to keep on learning to stay competitive. We also have to keep on learning to help us move up the corporate ladder.

However, many of us are already working full time. It is difficult to find time to learn. Computer-based learning may be able to alleviate part of the problem by allowing learning materials to be conveniently accessible, such as through the Web, or on compact disks. Learning from such materials are typically cheaper than learning from a live instructor in a classroom. Computer-based learning approaches give us the freedom to decide the time and the place to learn. Thus, computer-based learning is an efficient learning medium.

On the other hand, saving time and money to learn may not imply that we know what to learn. Though we may want to learn materials directly useful to our jobs, sometimes, it is not clear what those materials are, and where we can get hold of them. The problem becomes more acute if we are trying to move up in our career. What needs to be learnt may not be easy to define.

It should be apparent that there is a need to automatically provide appropriate learning materials in easily accessible manner for a user regarding a job.

SUMMARY OF THE INVENTION

The present invention provides computer-aided learning methods and apparatus for supplying appropriate learning materials to a user based on a job position that is related to the user. The materials are easily accessible and can prepare the user to do the job.

Every company, whether big or small, tries to satisfy certain customer needs. In order to satisfy those needs, companies have a number of jobs that need to be done. For a small company, the jobs might be setting up an electronic mailing system, or its accounting system. Big companies have more elaborate job classification and descriptions.

A company may try to fill its job needs by creating different positions. For example, to find someone to set up an electronic mailing system, the company might try to hire an information technologist. For a small company, the technologist might also be responsible for many other tasks, such as to install a new intelligent phone system for the company.

If the company has an organization chart, each node in the chart can denote one position. Every position has its responsibility, which can be performing one or more jobs by anyone filling that position. Some companies retain such information in their human resource department. If an employee is at a certain position, and his job requirement changes, the company can reflect the change by changing the job description of that position.

To fill a position with a job description, the company hires a person with a certain background. Such background, with its experience, can be acquired through learning certain materials.

In one embodiment, a computer stores in its database the one or more positions of the company, with their job descriptions, and the learning materials to be acquired to fill each position. Such information can be updated as changes occur.

Based on, for example, the organization chart and the position of the user, the computer can identify the jobs she needs to do, and the learning materials she needs to acquire, or she should have acquired, to do those jobs. From the organization chart, the computer can also identify the positions of her colleagues and her superiors, the jobs they need to do, and the corresponding learning materials to be acquired to do those jobs.

In one embodiment, the computer asks the user if she wants to move into positions different from her position, such as her supervisor's position. If the answer is affirmative, the computer can deliver appropriate learning materials for her to learn.

In another embodiment, a user has her own business. Her position is a small business owner. Based on her position, the computer can identify the numerous tasks or jobs she needs to do, and the learning materials she needs to acquire to do those jobs. Based on these information, the computer again can ask her if she wants to acquire certain knowledge to do some of her tasks. If she wants to, the computer can deliver those learning materials to her.

Learning materials provided to a user can be delivered through her computer. She can be in control as to when to learn. If the materials are delivered through a network, she can also have a certain degree of freedom to choose the learning location.

Thus the present invention can selectively provide appropriate materials to help a person do a job. The materials can be provided in an easily accessible manner.

Other aspects and advantages of the present invention will become apparent from the following detailed description, which, when taken in conjunction with the accompanying drawings, illustrates by way of example the principles of the invention.

BRIEF DESCRIPTION OF THE DRAWINGS

FIG. 13 shows one set of steps to generate a document in the document database of the present invention.

Same numerals in FIGS. 1–15 are assigned to similar elements in all the figures. Embodiments of the invention are discussed below with reference to FIGS. 1–15. However, those skilled in the art will readily appreciate that the detailed description given herein with respect to these figures is for explanatory purposes as the invention extends beyond these limited embodiments.

DETAILED DESCRIPTION OF THE INVENTION

The present invention can automatically provide learning materials regarding a job of a company to a user, who is associated with the company. The decision whether to provide learning materials to the user depends on job position that is related to the user. Learning materials are presented to the user for a number of reasons, such as to help her do the one or more jobs involved in the job position, or just to help her learn about the job position.

In one embodiment, the user is associated with the company if she can access the company's private information, or information that is not available to the public. The user can be associated with the company under a number of conditions. For example, she can be the company's employee, contractor or consultant.

Figure 1:
FIG. 1 shows a set of steps to implement one embodiment of the present invention.
Figure 1:
Figure 2:
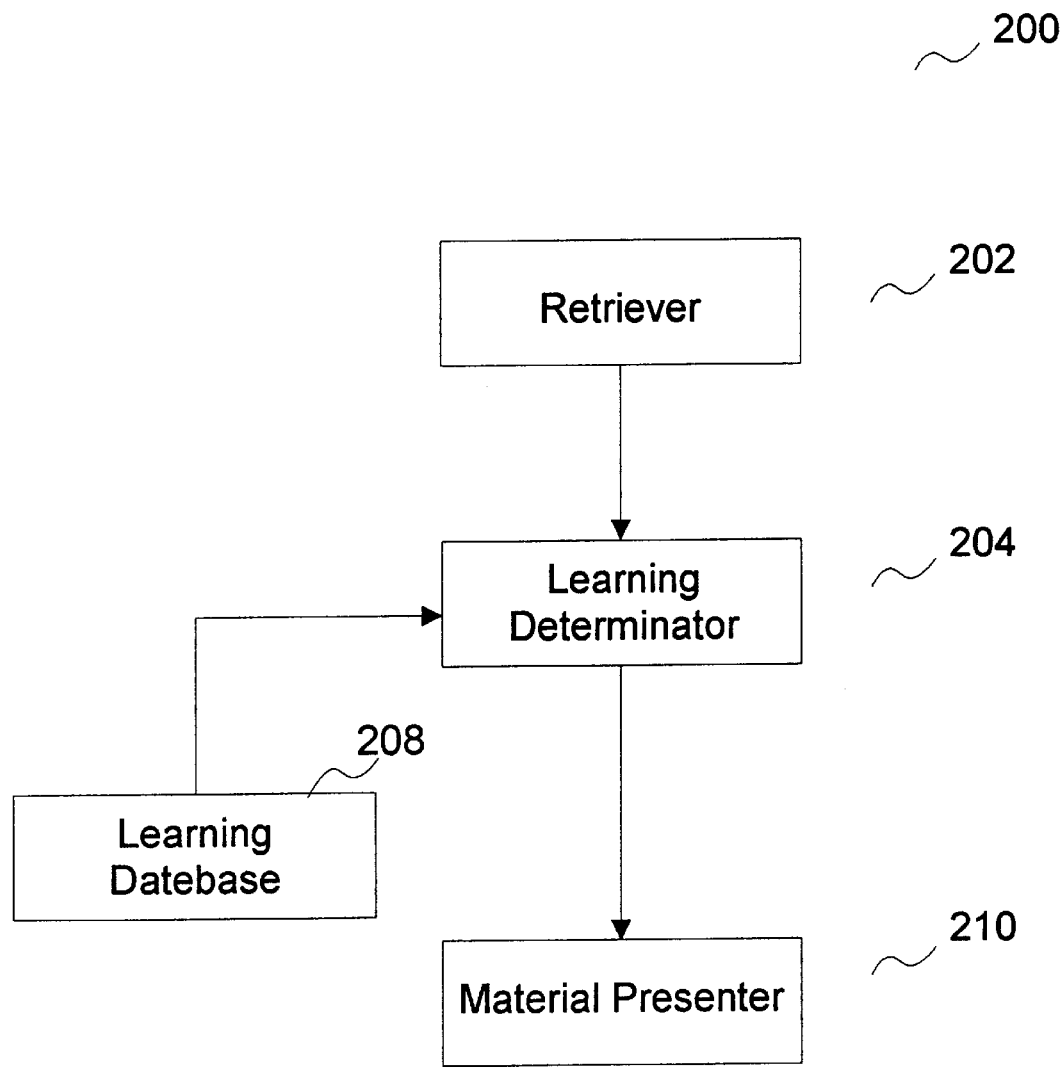
FIG. 2 shows an apparatus to implement one embodiment of the present invention.

There are a number of ways to implement the present invention. FIG. 1 shows one set of steps, 100; and FIG. 2 shows an apparatus, 200, to implement one such embodiment. First, a retriever, 202, retrieves (step 102) the job position, which, in one embodiment, is the job position occupied by the user. Then, based on one or more criteria, a learning determinator, 204, determines (step 104) whether learning materials should be presented to the user. In one embodiment, the retriever, 202, can identify her job position from her profile, which can also be stored in the apparatus.

In one embodiment, the learning determinator, 204, identifies the one or more jobs to be performed by a person occupying the retrieved job position; and the learning determinator, 204, may also ascertain the learning materials applicable to perform the one or more jobs. If learning materials should be presented to the user, a material presenter, 210, presents (step 106) the learning materials to her. Information such as the learning materials, and the jobs related to a job position, can be stored in a learning database, 208.

Figure 3:
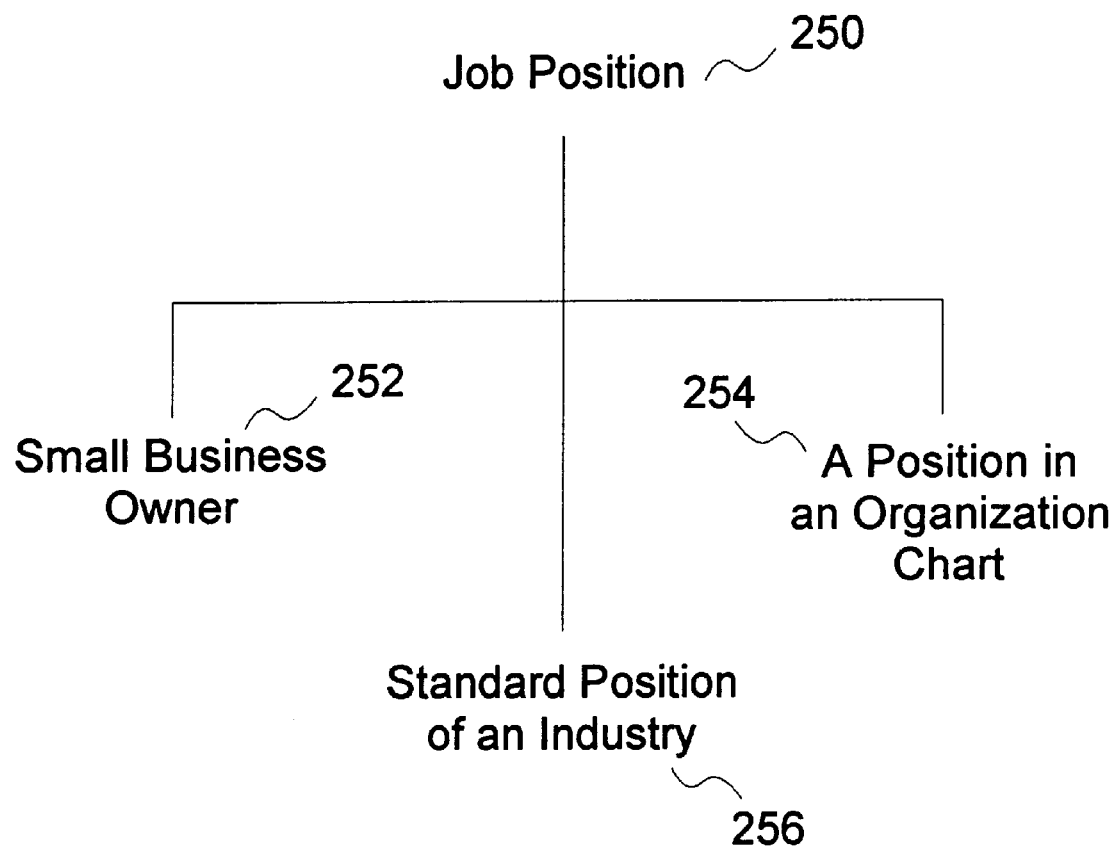
FIG. 3 shows examples of job positions applicable to the present invention.

FIG. 3 shows examples of job positions, 250, for the present invention. In one example, the user may be a small business owner, 252, without any or with very few employees. In one embodiment, the learning materials depend on the business the owner is in.

In another example, the user might hold a position, 254, in a company with many employees. That job position may be the position the company used to hire her, or later to evaluate her performance. Typically, the company includes an organization chart, which can be a chart showing her position relative to others. The chart is typically a hierarchical structure. It can start with the company's management team, including the major department heads, such as the chief technology officer. Then, under each department head, there is another chart showing the job positions of employees in her department. The job positions can include different grade levels, such as senior member of the technical staffs, and junior member of the technical staffs. In one embodiment, a position in the chart also includes data describing the one or more jobs a person in that position has to do. The title of the one or more jobs can be tied to their corresponding job position. Information in the chart can be stored in the learning database.

In yet another embodiment, the job position is from standard positions, 256, of an industry. For example, the industry is the banking industry, and the job position is a bank teller. The user may want to learn about a job position of a company, or she may want to occupy that position. In this situation, the job position is related to the user in the sense that she is interested in that job position.

In another embodiment, each job position only has one job to perform. In this case, the title of the position can be the title of the job.

People in different job positions typically have to perform different jobs. Based on a job position, the corresponding one or more jobs that are required to be done can be defined. For example, a small business owner might have to set up an intelligent mailing system, a Window NT environment on one of her computers, and an accounting system. She might have to connect a number of her computers and computer peripheral devices to a router. There can be many jobs she needs to do. Some of them can be quite complicated, and some of them might be related to each other. She might have to do some of them a number of times, such as preparing yearly income tax returns for her company. However, some of them she might only have to do once, such as setting up her intelligent mailing system. All of the jobs can be linked or partially linked together, into linked job titles. The linked job titles can indicate through a hierarchical structure which job should be performed before some of the other jobs. This can be for efficiency reasons. The linked job titles of a small business can be defined, for example, by those skilled in the art of that business, and will not be further described in this disclosure.

Similarly, an employee in an organization with a specific job position also has one or more jobs to perform. For example, if she is a circuit designer, she might have to know how to use a computer-aided design tool, the methodology of circuit design, the ways to test a designed circuit to see if it functions properly under normal and stressed conditions, and techniques to present her results to her colleagues.

Figure 4:
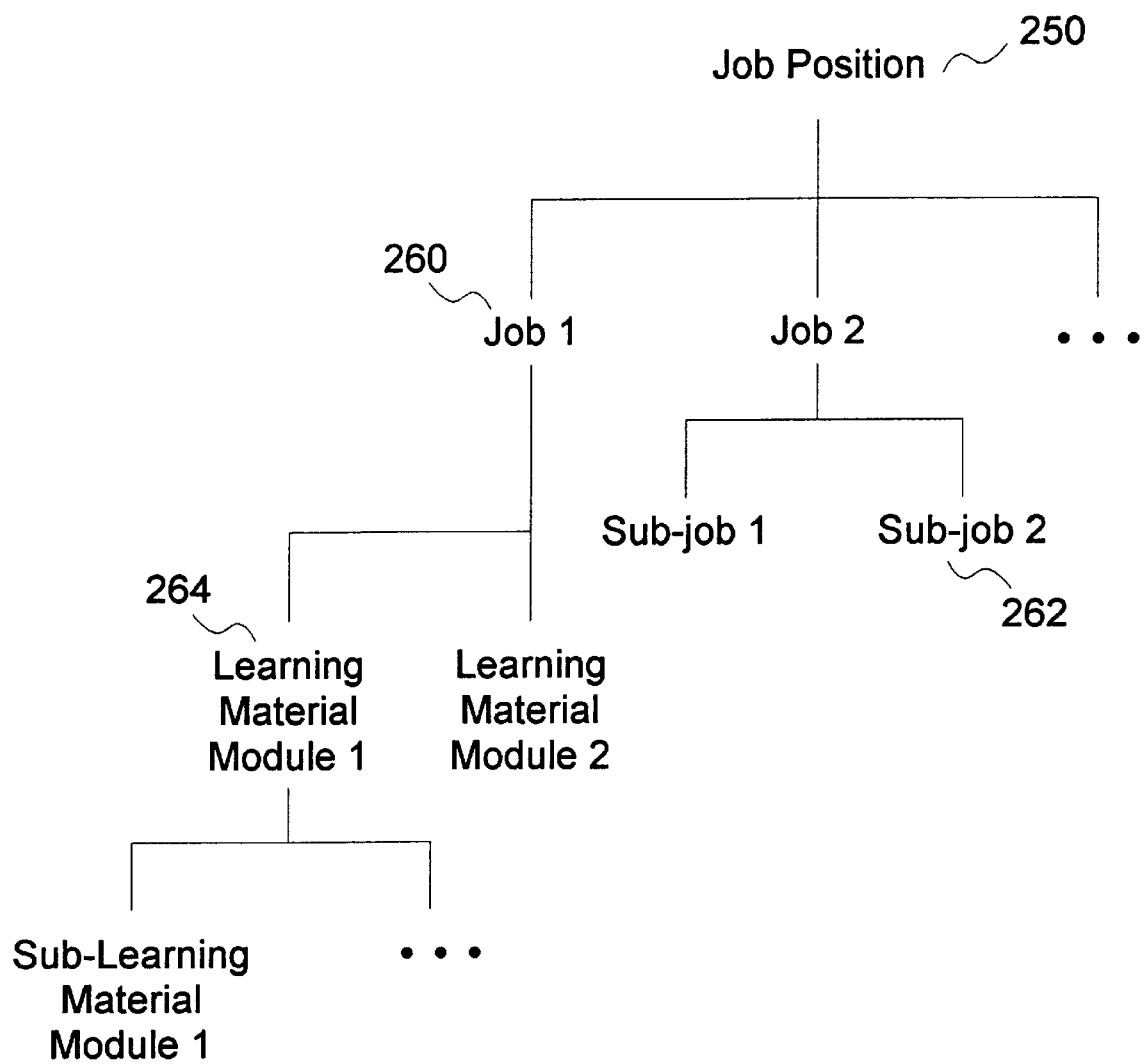
FIG. 4 shows one embodiment of relationships among the job position with different jobs to be done and the appropriate learning materials applicable for the jobs.

The one or more jobs to be performed for a job position can be classified. FIG. 4 shows one embodiment of hierarchical relationships among the job position, 250, and the one or more jobs, such as 260, to be performed. A job can be further classified into sub-jobs, such as 262. In one embodiment, such relationship information can be stored in the learning database, 208.

To accomplish different tasks one needs certain skills and knowledge. These skills and knowledge can be learnt. In one embodiment, the learning database also includes information of learning materials one should have acquired to accomplish a certain job.

FIG. 4 shows one embodiment of relationships among the appropriate learning materials for a job. In one embodiment, the learning materials are modularized, with each learning module, such as 264, being an object. Some of the learning materials are further classified into sub-learning material modules. These learning material modules may be stored in the learning database. In another embodiment, the apparatus can access through a network the learning materials when they are needed.

The learning material modules may be in different formats and approaches. For example, the materials can be a multimedia presentation, interactive presentations with questions and answers, or can have exercises. In one embodiment, a learning material module includes a scenario on solving a problem in a job. By following the scenario, the user can learn how the problem should be resolved.

Through the user's job position, the determinator, 204, can access the learning database to identify the one or more jobs required to be performed by the user. The determinator, 204, can also identify positions related to the user's positions, and the corresponding jobs required to be performed in those positions. Further, the determinator, 204, can also identify from the learning database the learning materials that one should have acquired to accomplish one or more of these jobs.

Figure 5:
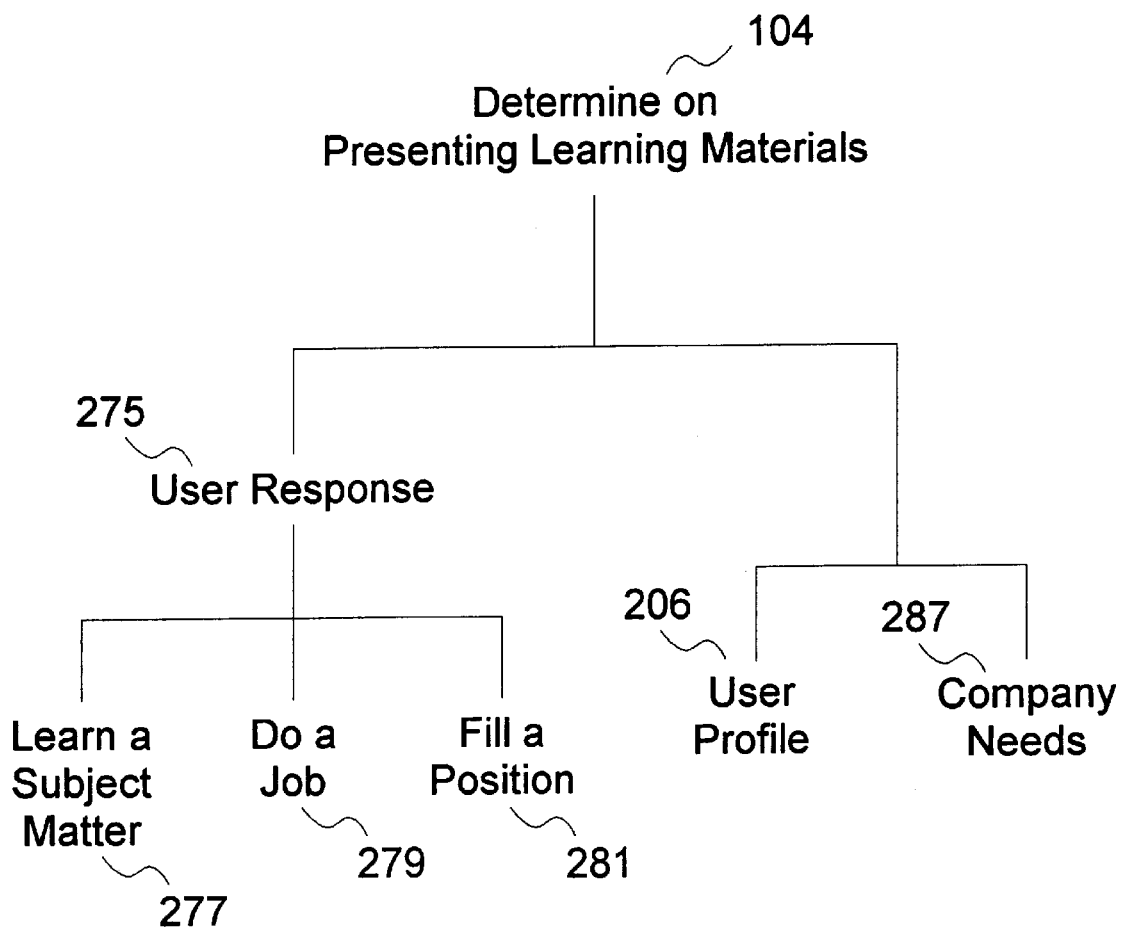
FIG. 5 shows a number of rules to determine if learning materials should be presented in the present invention.

FIG. 5 shows a number of rules applied by the learning determinator, 204, to determine (step 104) if learning materials should be presented. In one embodiment, the determinator, 204, determines based on the user's response (step 275). The learning determinator, 204, can ask the user a question. For example, the determinator, 204, can ask the user if she wants to learn a subject matter (step 277), such as how to invest in bonds. In another approach, the determinator, 204, asks the user if she wants to do a certain job (step 279), such as writing a program for an embedded controller.

Figure 6:
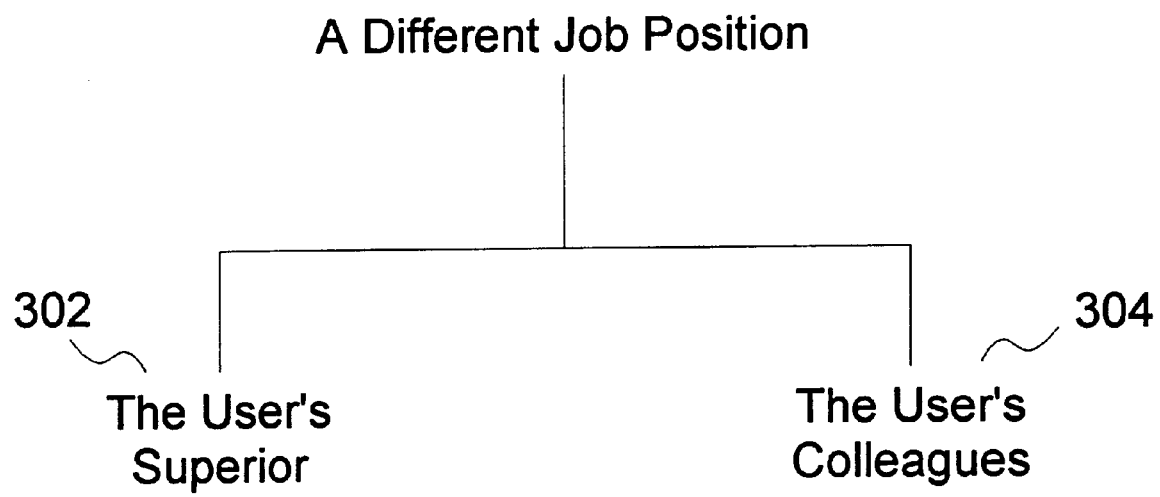
FIG. 6 shows examples of different job positions for a user in the present invention.

In yet another embodiment, the determinator, 204, asks the user if she wants to fill a certain job position (step 281). FIG. 6 shows examples of different job positions for the user to fill. The position can be the user's supervisor's or superior's position, 302, or the positions of the user's colleagues, 304. For example, if the user is a marketing manager, the determinator, 204, can ask her if she wants to be a finance manager. If the user wants to, which can be in the form of clicking a dialogue box, the material presenter, 210, presents materials to the user. As an illustration, if the user wants to be a finance manager, the determinator, 204, may decide to present certain learning materials regarding finance to her.

In another embodiment, the learning determinator decides without asking the user. In one embodiment, the decision depends on the needs, 287, of the company. For example, due to changes in the market place, the company requires their sales personnel to understand the Russian culture so as to sell its products in Russia. Due to such change in needs, the learning determinator, 204, decides that learning materials on Russian culture should be presented to the user.

Figure 7:
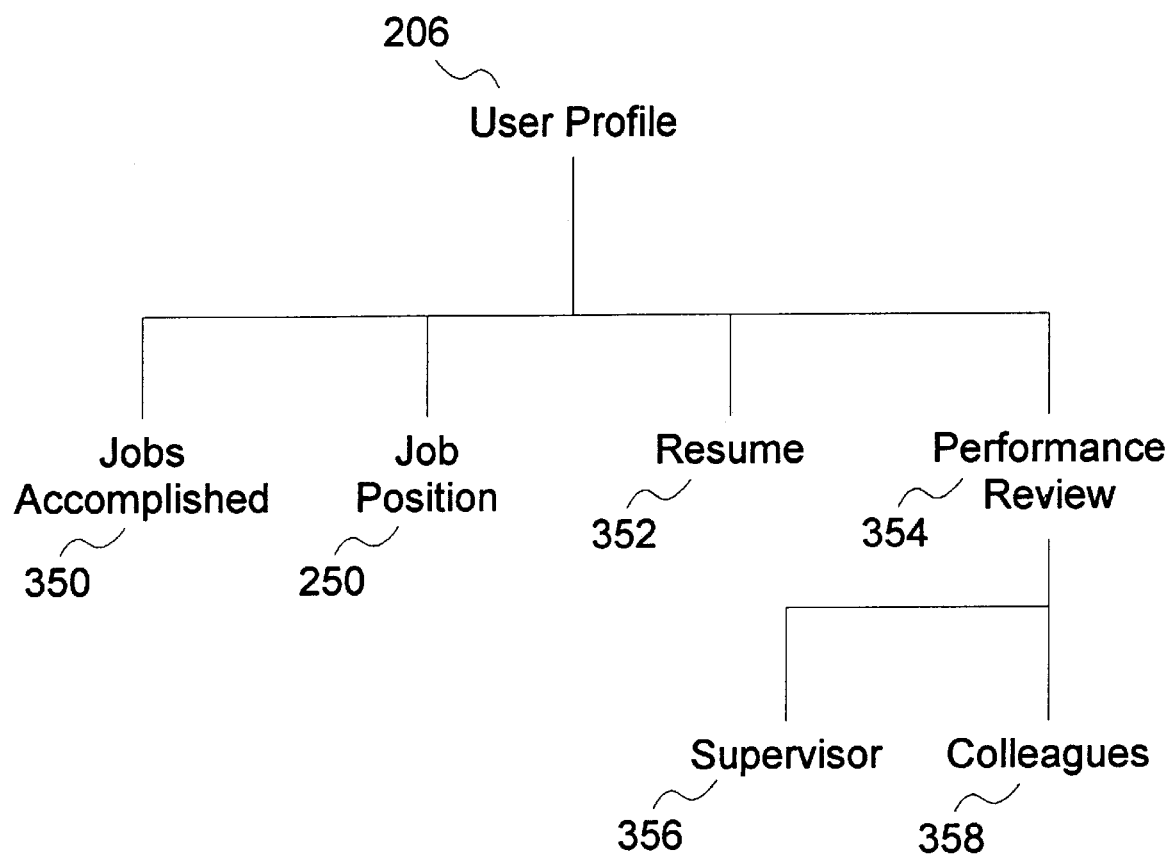
FIG. 7 shows examples of characteristics of the profile of a user in the present invention.

In yet another embodiment, the determination is based on a profile of the user, 206. FIG. 7 shows examples of characteristics in a user profile, 206. One example is the user's job position, 250. Another example is the user's resume, 352. For example, the company wants to hire a technical writer for a biochemistry product, but can only find a writer good in chemistry. Based on the user's resume, which shows that the writer does not have sufficient background in biology, the determinator, 204, decides to present learning materials on biology to the user.

Information in the user profile, 206, can include the jobs accomplished, 350, by the user. For example, if the user has written numerous programs in C, the determinator, 204, might decide that learning materials on the programming language C++ should be presented to the user.

In yet another embodiment, characteristics in the user profile, 206, include the user's performance review, 354, previously entered into the apparatus, 200, by, for example, the user's supervisor, 356, or her peers, 358. Her supervisor, 356, may indicate that she is weak in word processing skills, while her peers, 358, may indicate that the user is weak in communication. These information can be collected and stored in the user profile, 206. Based on such information, the determinator, 204, can decide that certain materials should be presented to the user.

Some of the above determination factors can be mixed and matched. For example, information in the user profile, 206, and the company needs can be combined to make the determination. As an illustration, the user has successfully designed a 50 MHz digital-to-analog converter. Due to changes in the market place, the company needs to sell a 500 MHz converter. The determinator, 204, based on such information, decides that the user should learn microwave integrated circuit technology. In another example, the user's preference is also taken into account. For example, the company needs people to sell in Russia and Malaysia. Such requirements are presented to the user. It will then be up to the user to decide which sales position she is interested in. From her preference, the determinator decides the types of learning materials to be presented to the user.

Figure 8:
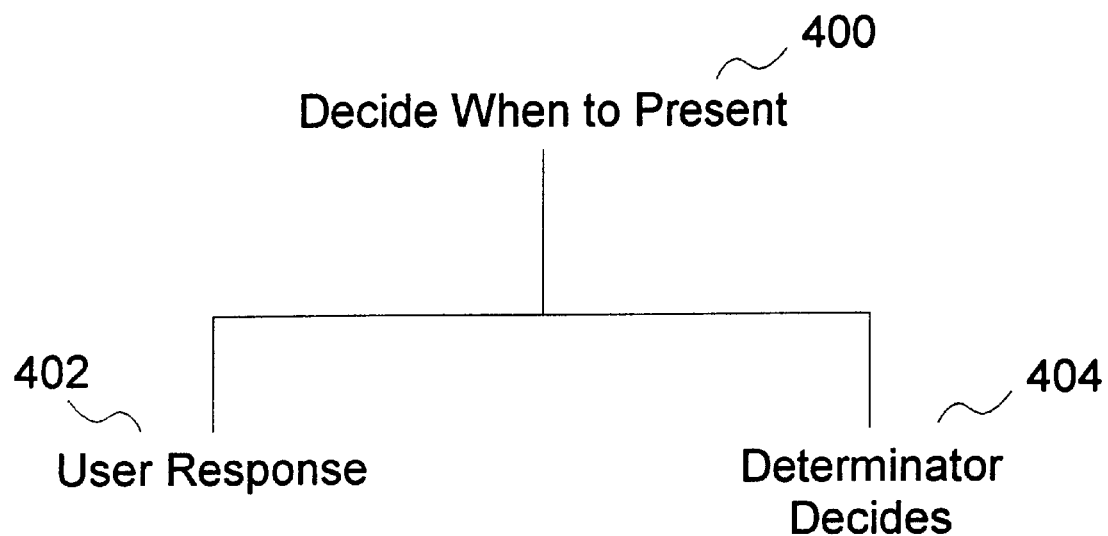
FIG. 8 shows one embodiment on deciding when to present learning materials in the present invention.

If materials should be presented, in one embodiment, the time to present can be decided in a number of ways, as shown, for example, in FIG. 8. It can be the material presenter, 210, or the determinator, 204, deciding (step 404) when to present the materials to the user. In one embodiment, the decision is based on the user's schedule or calendar, which can be in the user profile, 206, or has previously been entered into the apparatus. For example, the user has meetings from 9 am to 4 pm, today. The determinator, 204, based on such information, asks the user if she wants materials to be presented to her at 5 pm; or the determinator, 204, just tells her that materials will be presented to her at 5 pm today.

In another embodiment, the presenter, 210, first lets the user know that she might have to spend a certain number of hours on the materials. Then, when the user accesses her computer system every day, the determinator, 204, can ask the user if she wants to reserve 45 minutes that day to learn.

If she wants to, the determinator, 204, can ask the user to decide when on that day she wants to learn. Then, at the specified time, appropriate learning materials will be presented to the user. This approach depends on the user's response (step 402) to set the time to learn.

In one embodiment, learning materials can be from the company's documents. A document can include pictures, figures and text, which can be in digital format. In another embodiment, a document includes information that can be processed in digital format. A company database can store the documents previously prepared by the employees of the company. These documents encapsulate a lot of the company's knowledge, and can be used as learning materials for the user. Such learning materials can also provide up-to-date information to the user because some of the documents might have just been generated by the employees. Reading other's documents can be a good way to learn. This is similar to the idea of learning by observing what others have done. Sometimes, this learning approach is known as learning through osmosis.

In this embodiment, at least some of the learning materials for the user may be generated from the company documents, which can be in a company's database. At least some of these documents are typically not available to the public. In one embodiment, the database can also store documents related to the company's line of business. Such related documents can be from the company's customers, or can also be publicly available documents. In one embodiment, such related documents are also known as company documents.

Figure 9:
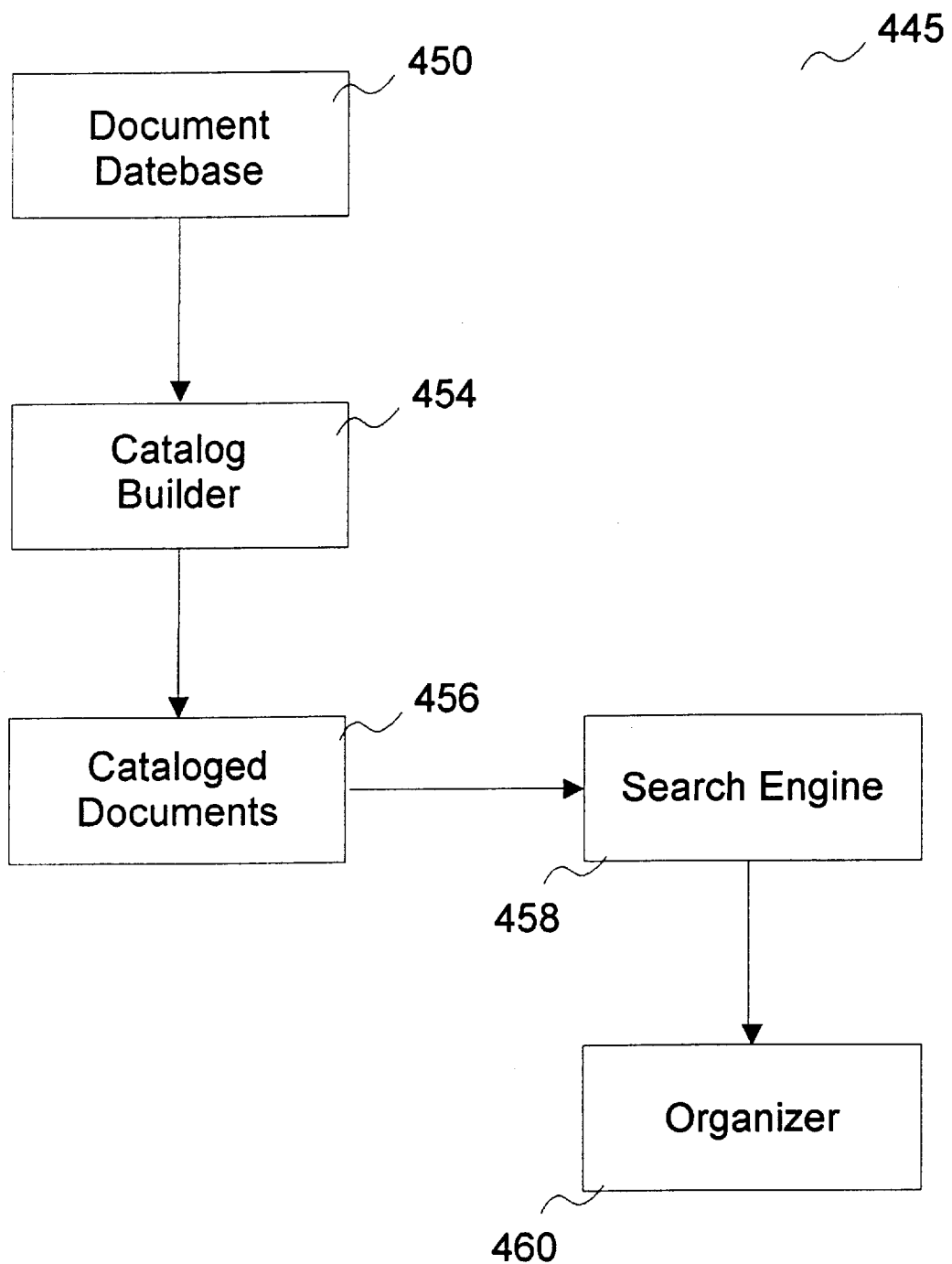
FIG. 9 shows one embodiment in the present invention of extracting documents in a database.
Figure 10:
FIG. 10 shows one approach to extract documents in a database using the present invention.
Figure 10:

FIG. 9 shows one embodiment, 445, of extracting documents from the database by the learning determinator, 204, for the user to learn. FIG. 10 shows one approach, 473, of using the embodiment in FIG. 9 to extract documents.

In one embodiment, the information contained in the extracted documents has at least one common structure or characteristic, or is not of free form. Those documents are structured documents. As an example, the formats of the documents have one or more common characteristics. To illustrate, the documents are letters written with a word processor by the company's secretaries. Such letters usually have the common structure of having the company's name as its header, the company's address and a date at specified locations.

In another embodiment, the extracted documents can fit into specific templates. In one embodiment, a template can shape an extracted document when the document was created, or can describe or identify the shape of the extracted document. Every document with the same template can include identical text or formatting that is based on the template. Such text or formatting can be the style of the documents or can include macros, which can be modules, where each module can denote many operations. For example, in one set of extracted documents, the template is for the company's annual report; then the template includes sections covering the company's revenue, cash flow, balance sheet and forecast.

In one embodiment, the learning determinator, 204, includes a catalog builder, 454, a search engine, 458, and an organizer, 460.

The catalog builder, 454, can group the structured documents in the database under different categories. The documents grouped or categorized can be known as cataloged documents. In one embodiment, the catalog builder, 454, builds the catalog based on the organization chart, or the linked job titles of the company. In another embodiment, categories in the catalog are similar to nodes in the organization chart, or the linked job titles of the company; for example, each category in the catalog corresponding to a job position or a job title. In another embodiment, a job position can be linked to more than one category. In yet another embodiment, at least a part of the catalog is built based on key words in the documents, or templates used in the documents.

The catalog can be reduced in size. In one embodiment, one specific catalog also depends on at least one characteristic of the profile of the user. It can be called a personalized catalog. For example, only categories related to the user's job position are included in this specific catalog. So, in one example, only categories for the user's job position, the user's direct superiors' position and the job positions of the peers of the user are included. This specific catalog can be much smaller than the catalog describing all of the company's job positions.

The catalog builder can also be responsible to reference each document by, or group each document to, its corresponding one or more categories. In one embodiment, each document, in addition to its content, also includes one or more attributes describing the document. These attributes are information regarding the document. But, unlike the content of the document, these attributes typically are information that do not have to be directly conveyed to the user receiving the document, before the user can learn from the document. For example, attributes can include the name of the person who creates the document, the job she was doing when she created the document, its version, and the identification of the document's template, if there is one. Note that the document can be received by the user, so if she wants to, she can decipher the document to get the attributes.

The document categorizing process can depend on at least one of the document's attributes. For example, if the user is an architect, and she has created a design of a building, then the attributes of the document holding the design can include her job title. Based on the job title, the document can be grouped to, categorized to or referenced by the category of an architect in a catalog. In another example, the shape or format of a document can be described by a template. That template fits into a category of a catalog. Then that document can be referenced by that category, which can be related to a specific job.

Figure 11:
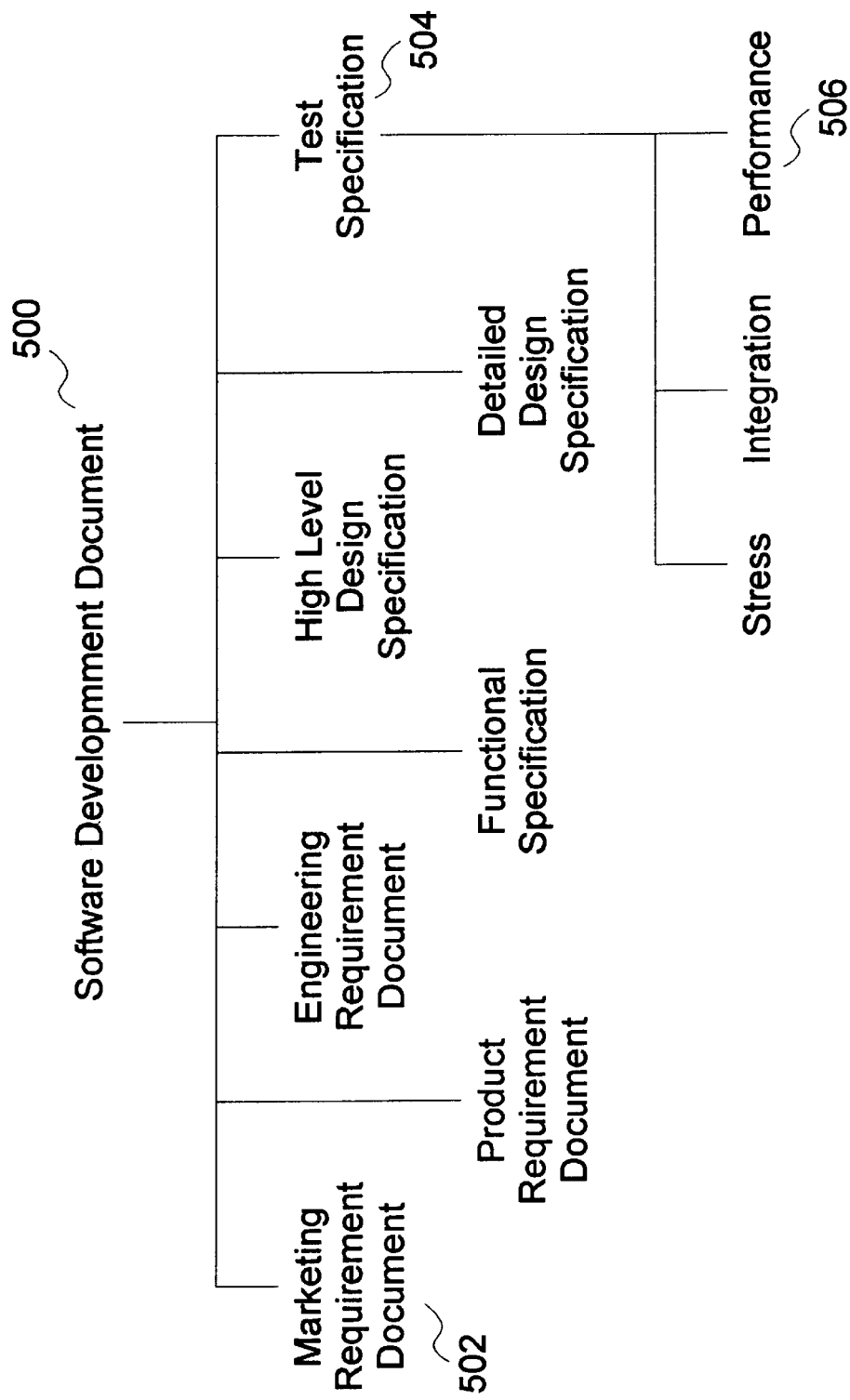
FIG. 11 shows an example of how software development documents are cataloged in the present invention.

FIG. 11 shows an example of how software development documents, 500, can be categorized into cataloged documents. If the company is in software development, typically, some of the documents in the company can be categorized as shown in FIG. 11. After cataloging (step 475), the documents are categorized accordingly, and become cataloged documents, 456. As an illustration, all of the marketing requirement documents, 502, are cataloged, and may be stored under the same category.

In one embodiment, the learning determinator, 204, decides on the documents the search engine, 458, should search for among the cataloged documents, 456. As an example, the user is a software test engineer, and the learning determinator, 204, decides that learning materials on performance test specification, 506, of an ATM networking software program should be presented to her. The search engine, 458, in the learning determinator, 204, identifies all of the documents related to such test specifications under the category of performance test specification, 506, and extracts them from the database.

As an illustration, the company does not have any performance test specification, 506, of an ATM networking software program. Then, the searcher can identify related documents based on one or more rules. One set of such rules may be relationship rules, which group related terms together. In one approach, if the searcher has to search for any one term, the searcher automatically searches for all of its related terms. For example, the term, frame relay, is related to the term, ATM. One relationship rule groups the two terms together. Although the company does not have any documents on a performance test specification, 506, of a ATM networking software program, the company has such documents for frame relay. Based on the relationship rule, the search engine, 458, also searches for documents on performance test specifications, 506, of frame relay software. Such documents are identified, and extracted for the user.

Note that cataloging the documents reduces the amount of searching required. However, it is not necessary to catalog the documents before they can be searched. One embodiment does not include the catalog builder and the cataloged documents. Searching can be performed directly on all of the documents in the database. In this embodiment, searching can be based on key-words, including the job titles or the job position. The query can be based on the job description, which describes, for example, the type of work involved in the job.

Figure 12:
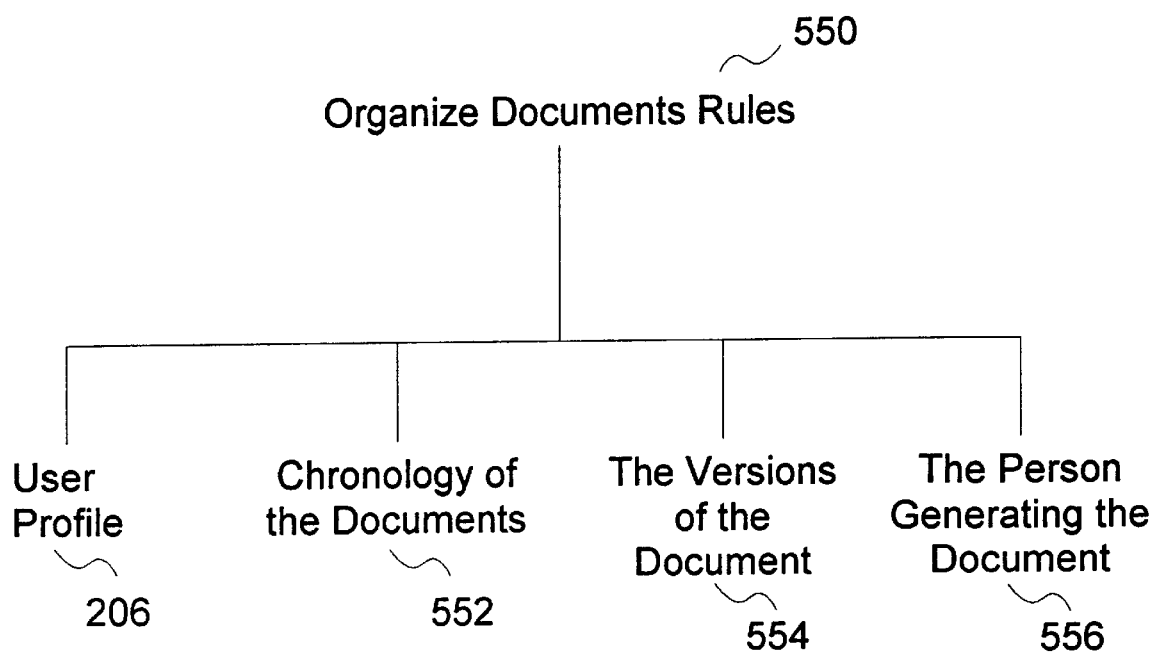
FIG. 12 shows examples of rules to organize extracted documents using the present invention.

After the documents are extracted, they can be organized for presentation. FIG. 12 shows examples of rules, 550, to organize extracted documents in the company. In one embodiment, organization includes prioritizing the extracted documents, so that, for example, higher priority documents can be presented before lower priority documents.

The documents can be organized based on the company information, which can be information not available to the public. For example, the company information includes the document chronology, 552, the document version, 554, the person generating the document, 556, and the profile, 206, of the user.

As mentioned, one rule to organize is based on the chronology, 552, of the extracted documents. For example, documents that were recently created have higher priority than those created long time ago.

Another rule is based on the versions, 554, of the documents. It is typical to have a number of iterations before the final document is produced. Each iteration can be a version. One organization rule is to rank the older versions with higher priority, and to present them before the newer versions. Such a rule helps the user understand the process to get to the final document.

The identity, 556, of the person generating the documents can be used for an organization rule. For example, if the originator is the user, the document has a low priority.

Another rule includes information in the user profile, 206, such as the user's job position. For example, a document is related to more than one job position. One rule can be that such a document is of lower priority as compared to a document that is related only to the user's job position. One or more of such rules help organize the extracted documents.

Figure 14:
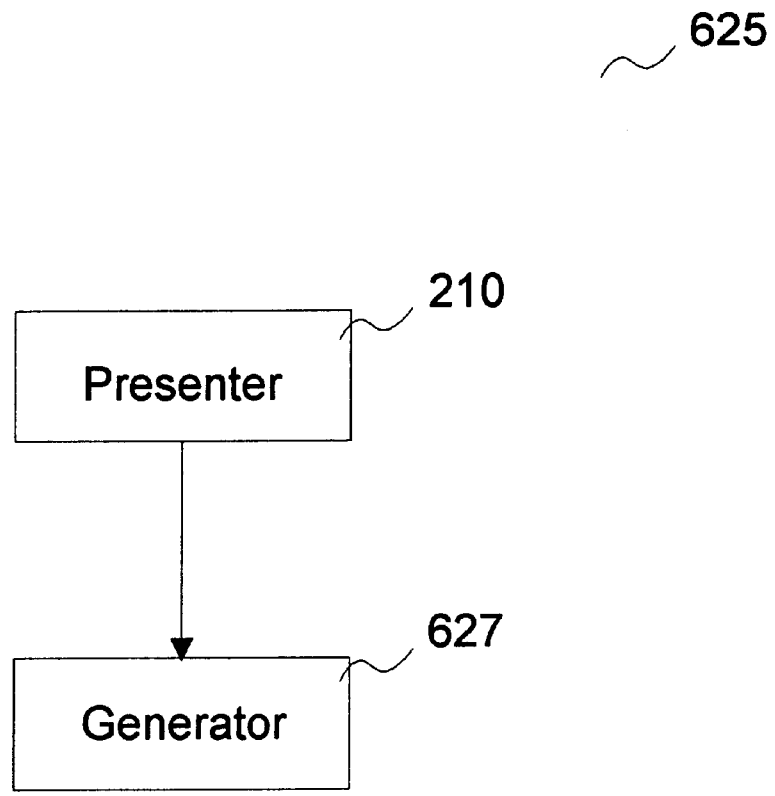
FIG. 14 shows one embodiment to generate a document in the document database of the present invention.

Through learning from the presented materials, the user can produce her own documents, which can be used as structured documents in the database. FIG. 13 shows one set 600 of steps to generate a document for the document database. FIG. 14 shows one embodiment, 625, to generate the document. After learning materials are presented (Step 602) by the presenter, 210, to the user, she does (Step 604) her job with the help of a generator, 627. This can be her word processor, simulator, or the like. For example, she starts to write the performance test specification of the ATM networking software program. As she does her job, at least one such document is generated (Step 606), such as a version of the performance test specification. That document is stored (Step 608) in the document database, 450. Usually she will generate, through the generator, 627, many versions. In one embodiment, all of these versions are stored.

In one embodiment, the documents created by the user are automatically cataloged. For example, the profile of the user can be in the apparatus, and the job the user is performing can also be in the apparatus. Based on such information, the one or more documents generated can be automatically categorized. For example, the documents generated by the user in the above example can be classified under the category of performance test specifications, and can be stored as such cataloged documents. Next time when another user needs to learn about a performance test specification, there will be one more set of documents to present to him. As stated above, the set of documents may have many versions. The search engine, 458, may limit the number of versions to be extracted, and the organizer, 460, may determine the priority of those extracted documents to be presented to the other user.

Figure 15A:
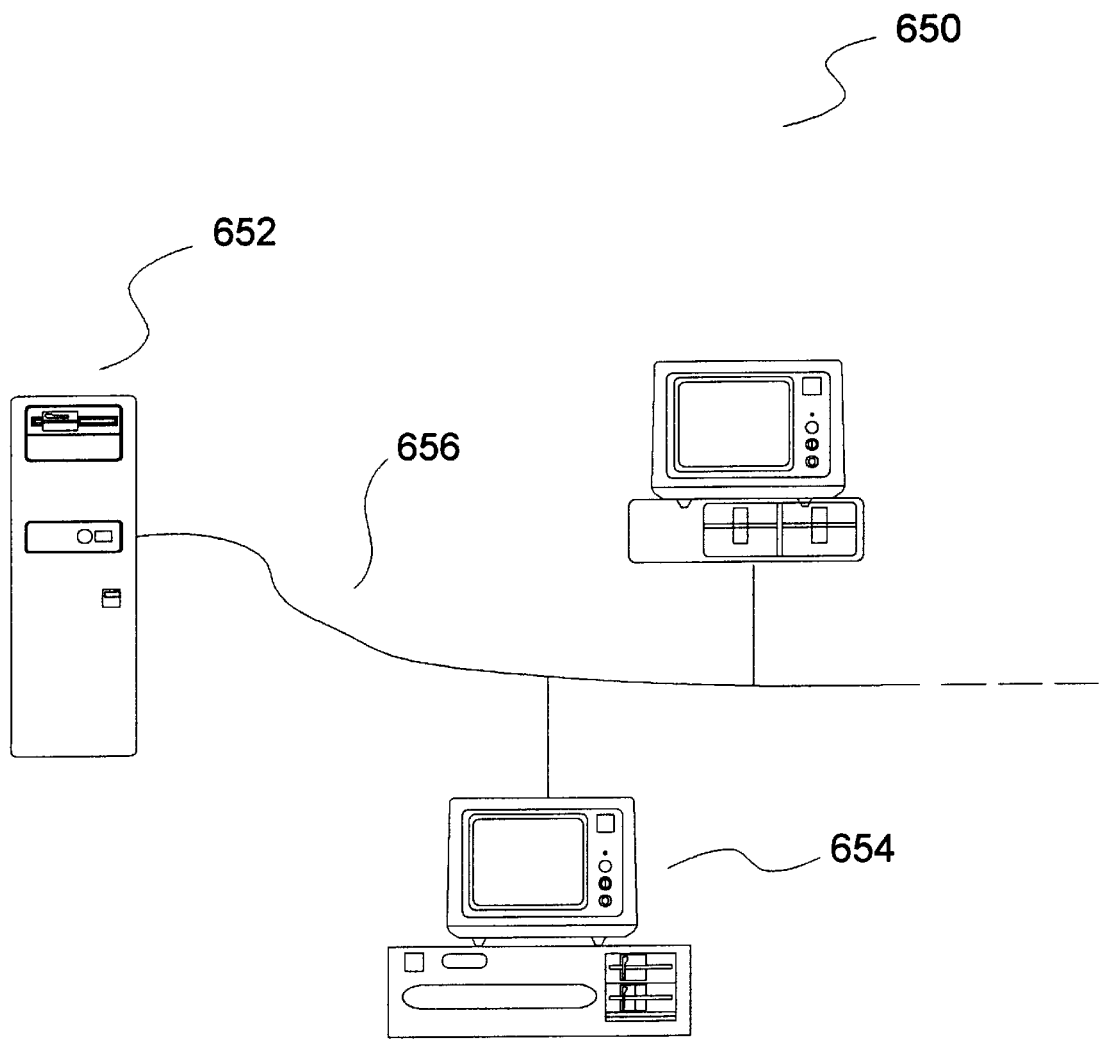
FIGS. 15A–B show examples of hardware to implement one embodiment of the present invention.
Figure 15B:
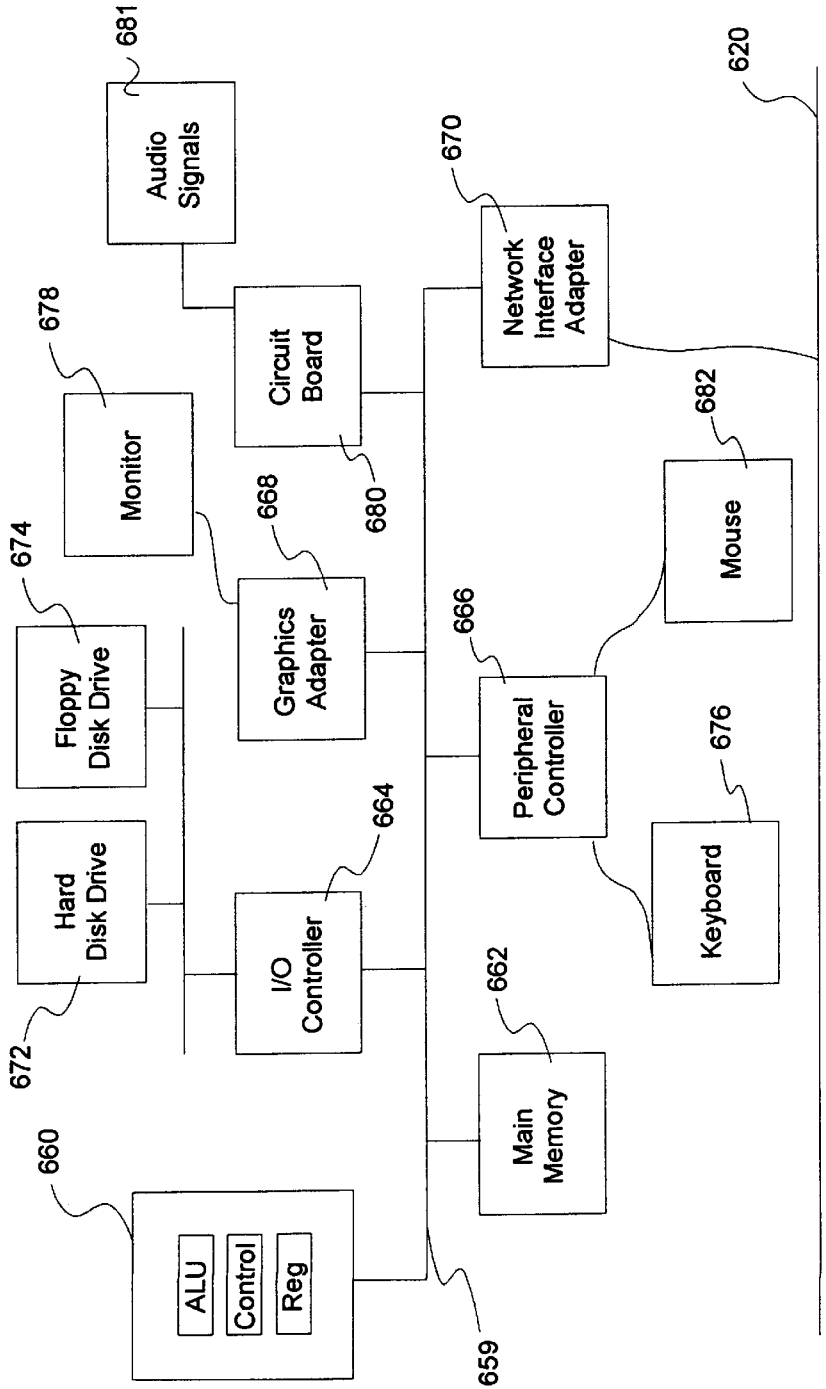

FIGS. 15A–B show examples of hardware to implement one embodiment of the present invention. FIG. 15A shows one physical embodiment 650 implementing one embodiment of the invention, preferably in software and hardware. The embodiment 650 includes a server computer 652 and a number of client computers, such as 654, which can be a personal computer. Each client computer communicates to the server computer 652 through a dedicated communication link, or a computer network 656.

FIG. 15B shows one embodiment of a client computer 654. It typically includes a bus 659 connecting a number of components, such as a processing unit 660, a main memory 662, an I/O controller 664, a peripheral controller 666, a graphics adapter 668, a circuit board 680 and a network interface adapter 670. The I/O controller 664 is connected to components, such as a harddisk drive 672 or a floppy disk drive 674. The peripheral controller 666 can be connected to one or more peripheral components, such as a keyboard 676 or a pointing device 682. The graphics adapter 668 can be connected to a monitor 678. The circuit board 680 can be coupled to audio signals 681; and the network interface adapter 670 can be connected to the network 620, which can be the Internet, an intranet, the Web or other forms of networks. The processing unit 660 can be an application specific chip. In another embodiment, the client computer 654 is a thin-client, with most of the its physical components in the server computer, 652.

Different elements in the present invention may be in different physical components. For example, the apparatus may be in the client computer. In another embodiment, the learning determinator, 204, the user profile, 206, the retriever and material presenter, 210, are in the client computer, while the learning database is in the server computer. In yet another embodiment, the learning database and the user profile, 206, are in the server computer, and the retriever, the learning determinator, 204, and the material presenter, 210, are in the client computer. In one embodiment, the client computer only includes the material presenter, 210.

In one embodiment, the learning database does not have the required learning materials. However, a learning module includes information, such as the place and the time the learning materials are available to the user. In another embodiment, the determinator, 204, can access information, such as through the Web, regarding when and where to learn. Learning can be through an extension class from a University in live instructor-led courses. Based on the user profile, 206, the determinator, 204, may be aware of the user's home and company address, and the user's availability, such as her schedule or calendar, which can indicate, for example, when she is planning to take a vacation. Through such information, the learning determinator, 204, can provide learning options to the users, which can depend on the proximity of her work and home relative to the learning location, and her availability. After the user selects one of the options, the determinator can also help the user register, through, for example, the Web.

In another embodiment, the materials to be presented to the user also depend on the capability of the user. For example, if the user is highly ranked in the company, as shown by the user profile, 206, only essential materials are presented, with simple materials ignored.

The present invention illustrates a number of embodiments where the job position related to the user is the job position occupied by the user. Note that the job position related can be the job position the user is interested in, or some other job positions. Then, based on the retrieved job position, the corresponding learning materials may be identified, and presented to the user.

The present invention describes the learning determinator determining whether learning materials should be presented to the user. Note that in one embodiment, this determining step is before identifying the learning materials, but after identifying the job position, or the one or more jobs to be done. In another embodiment, this determining step is after identifying the learning materials.

The present invention describes methods to help the user. In one embodiment, the company, based on its needs and based on the user's profile, selects the user to see if materials should be provided to her. In this embodiment, the company can have a job need. Then, based on information on its employees, the company may pre-select a user to see if materials should be presented to her.

In one embodiment, the one or more jobs related to job position, with the descriptions for the jobs, are stored in the profile of the user occupying that job position.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

What is claimed is:

1. A computer-aided learning method for helping a user regarding a job in a company, the method comprising the steps of:
   retrieving, by a computer, a job position, which identifies the one or more jobs needed to be done for the job position; and
   determining, by the computer, whether learning materials should be presented to the user, with the materials helping the user learn about the one or more jobs;
   wherein:
      the company has a number of documents:
      at least some of the learning materials are from the company documents;
      at least some of the documents are categorized;
      the method further comprises the steps of:
         searching at least some of the documents to extract more than one documents to be the learning materials; and
         organizing at least some of the extracted documents based on one or more rules to prioritize them.

2. A computer-aided learning method as recited in claim 1 wherein:
   the user is the company's employee;
   the job position is related to the user; and
   the materials help the user do the one or more jobs.

3. A computer-aided learning method as recited in claim 1 wherein the user occupies the job position.

4. A computer-aided learning method as recited in claim 1 wherein:
   the company has an organization chart showing a plurality of job positions; and
   the job position is a position in the organization chart.

5. A computer-aided learning method as recited in claim 1 wherein the job position retrieved is the job position the user is interested in.

6. A computer-aided learning method as recited in claim 1 wherein the job position retrieved is different from the job position occupied by the user.

7. A computer-aided learning method as recited in claim 6 wherein the job position retrieved is the position occupied by the user's superior in the company.

8. A computer-aided learning method as recited in claim 1 wherein the job position is the position of a business owner.

9. A computer-aided learning method as recited in claim 8 wherein at least one job identified depends on the type of business.

10. A computer-aided learning method as recited in claim 1 wherein, if materials should be presented, the method further comprises the step of presenting, by the computer, the learning materials to the user.

11. A computer-aided learning method as recited in claim 10 wherein the time to present depends on information about the user's availability.

12. A computer-aided learning method as recited in claim 1 wherein, if materials should be presented, the method further comprises the step of identifying, by the computer, the place where and the time when the learning materials are available for the user.

13. A computer-aided learning method as recited in claim 12 wherein the step of identifying further depends on information about the user's availability.

14. A computer-aided learning method as recited in claim 1 wherein the step of determining depends on at least a need of the company.

15. A computer-aided learning method as recited in claim 14 wherein the user is selected by the company based on at least one characteristic in the user profile.

16. A computer-aided learning method as recited in claim 14 wherein the step of determining depends on at least one characteristic in the profile of the user.

17. A computer-aided learning method as recited in claim 1 wherein the step of determining depends on at least one characteristic, other than the job position, in the profile of the user.

18. A computer-aided learning method as recited in claim 6 further comprising the step of presenting, by the computer, the materials to the user if, as determined by the computer, the user is interested in the different position.

19. A computer-aided learning method as recited in claim 1 further comprising the step of ascertaining by the computer the learning materials.

20. A computer-aided learning method as recited in claim 19 wherein the materials ascertained depends on at least one characteristic in the profile of the user.

21. A computer-aided learning method as recited in claim 19 further comprising the step of presenting, by the computer, the materials to the user if, as determined by the computer, the user is interested in the learning materials.

22. A computer-aided learning method as recited in claim 1 wherein:
   the one or more jobs are performed by the user, who generates one or more documents in performing the one or more jobs; and the documents generated become the company documents.

23. A computer-aided learning method as recited in claim 1 wherein the step of searching depends on the one or more jobs.

24. A computer-aided learning method as recited in claim 1 wherein the information in the one or more extracted documents has at least one common structure.

25. A computer-aided learning method as recited in claim 1 wherein the step of searching depends on the one or more jobs, and job that is related to the one or more jobs.

26. A computer-aided learning method as recited in claim 1 wherein at least one rule depends on information regarding the company.

27. A computer-aided learning method as recited in claim 1 wherein at least one rule depends on the chronology of two of the extracted documents.

28. A computer-aided learning method as recited in claim 1 wherein at least one rule depends on the versions of two of the extracted documents.

29. A computer-aided learning method as recited in claim 1 wherein at least one rule depends on the identity of the one or more persons generating the documents.

30. A computer-aided learning method as recited in claim 1 wherein the documents are categorized depending on at least one characteristic of the profile of the user.

31. A computer-aided learning method as recited in claim 1 wherein:
  the one or more jobs are performed by the user, who generates one or more documents in performing the one or more jobs;
  the documents generated become the company documents; and
  the method further comprises the step of categorizing, by the computer, at least one of the generated documents.

32. A computer-aided learning method as recited in claim 1 wherein:
  at least one document including at least one attribute, which describes that document; and
  the method further comprises the steps of:
    retrieving, by a computer, the at least one attribute of the at least one document; and
    categorizing, by the computer, the document based on the retrieved attribute.

33. A computer-aided learning methods as recited in claim 1 wherein:
  the company includes an organization chart; and
  at least some of the documents are categorized depending on the organization chart.

34. A computer-aided learning method as recited in claim 1 further comprising the steps of:
  searching, by a computer, the documents categorized to extract one or more of them to be the learning materials; and
  wherein the step of searching depends on the one or more jobs needed to be done for the job position, and a job that is related to the one or more jobs.

35. A computer-aided apparatus for helping a user, who is associated with a company, regarding a job in the company, based on a job position related to the user, the apparatus comprising:
  a retriever configured to retrieve the job position, which identifies the one or more jobs needed to be done for the job position; and
  a determinator configured to determine whether learning materials should be presented to the user, with the materials helping the user learn about the one or more jobs;

wherein:
  the company has a number of documents;
  at least some of the learning materials are from the company documents;
  at least some of the documents are categorized;
  at least some of the documents are searched to extract more than one documents to be the learning materials; and
  at least some of the extracted documents are organized based on one or more rules to prioritize them.

36. A computer-aided learning apparatus as recited in claim 35 wherein:
  the user is the company's employee;
  the job position is related to the user; and
  the materials help the user do the one or more jobs.

37. A computer-aided learning apparatus as recited in claim 35 wherein the user occupies the job position.

38. A computer-aided learning apparatus as recited in claim 35 wherein:
  the job position is a position in an organization chart of the company.

39. A computer-aided learning apparatus as recited in claim 35 wherein the job position retrieved is the job position the user is interested in.

40. A computer-aided learning apparatus as recited in claim 35 wherein the job position retrieved is the position of a business owner.

41. A computer-aided learning apparatus as recited in claim 35 further comprising a presenter configured to present learning materials to the user.

42. A computer-aided learning apparatus as recited in claim 35 wherein the determinator is configured to determine depending on at least a need of the company.

43. A computer-aided learning apparatus as recited in claim 35 wherein:
  one or more documents are generated when the one or more jobs are performed by the user; and
  wherein the documents generated become the company documents.

44. A computer-aided learning apparatus as recited in claim 35 wherein:
  at least one rule depends on information regarding the company.

45. A computer-aided learning apparatus as recited in claim 35 wherein:
  the documents categorized are searched to extract one or more of them to be the learning materials; and
  the searching depends on the one or more jobs needed to be done for the job position, and a job that is related to the one or more jobs.

46. A computer-aided learning apparatus as recited in claim 35 wherein the documents are categorized depending on at least one characteristic of the profile of the user.

47. A computer-aided learning apparatus as recited in claim 35 wherein:
  one or more documents are generated when the one or more jobs are performed by the user; and
  wherein:
    the documents generated become the company documents; and
    the documents are categorized.

* * * * *

UNITED STATES PATENT AND TRADEMARK OFFICE
CERTIFICATE OF CORRECTION

PATENT NO.       : 6,126,448
APPLICATION NO.  : 09/110569
DATED            : October 3, 2000
INVENTOR(S)      : Ho et al.

Page 1 of 1

It is certified that error appears in the above-identified patent and that said Letters Patent is hereby corrected as shown below:

In Claim 25, at Column 13, Line 11, after "jobs, and", insert --a--.

Signed and Sealed this

Fifteenth Day of April, 2008

JON W. DUDAS
*Director of the United States Patent and Trademark Office*